(12) United States Patent
Kimura et al.

(10) Patent No.: US 9,090,827 B2
(45) Date of Patent: Jul. 28, 2015

(54) LONG-LASTING PHOSPHOR CERAMICS AND MANUFACTURING METHOD THEREOF

(75) Inventors: Yuji Kimura, Tokyo (JP); Yasushi Takai, Tokyo (JP); Hirofumi Kawazoe, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 828 days.

(21) Appl. No.: 13/147,933

(22) PCT Filed: Feb. 26, 2010

(86) PCT No.: PCT/JP2010/053037
§ 371 (c)(1),
(2), (4) Date: Aug. 4, 2011

(87) PCT Pub. No.: WO2010/098426
PCT Pub. Date: Sep. 2, 2010

(65) Prior Publication Data
US 2011/0291050 A1    Dec. 1, 2011

(30) Foreign Application Priority Data

Feb. 27, 2009   (JP) ................. 2009-045944

(51) Int. Cl.
| | |
|---|---|
| C09K 11/02 | (2006.01) |
| C09K 11/77 | (2006.01) |
| C04B 35/44 | (2006.01) |
| C04B 35/626 | (2006.01) |
| C09K 11/01 | (2006.01) |

(52) U.S. Cl.
CPC ............ C09K 11/7792 (2013.01); C04B 35/44 (2013.01); C04B 35/6268 (2013.01); C04B 35/62685 (2013.01); C09K 11/01 (2013.01); C04B 2235/3206 (2013.01); C04B 2235/3208 (2013.01); C04B 2235/3213 (2013.01); C04B 2235/3215 (2013.01); C04B 2235/3222 (2013.01); C04B 2235/3224 (2013.01); C04B 2235/3262 (2013.01); C04B 2235/3409 (2013.01); C04B 2235/5436 (2013.01); C04B 2235/604 (2013.01); C04B 2235/763 (2013.01)

(58) Field of Classification Search
CPC .............. C09K 11/01; C09K 11/7792; C09K 11/7734; C09K 11/7706; C09K 11/7768; C09K 11/7774; C09K 11/7787; C04B 2235/3206; C04B 2235/3208; C04B 2235/3213; C04B 2235/3215; C04B 2235/3222; C04B 2235/3262; C04B 35/44; C04B 35/6268; C04B 35/62685
USPC ...... 252/301.4 R, 301.4 H, 301.4 F; 423/275; 264/37.29, 21, 681; 518/708; 588/261, 588/901
See application file for complete search history.

(56) References Cited

U.S. PATENT DOCUMENTS

| | | | |
|---|---|---|---|
| 3,864,273 A | 2/1975 | Forbes et al. | |
| 5,853,614 A | 12/1998 | Hao et al. | |
| 7,557,985 B2 | 7/2009 | Hama et al. | |
| 8,470,200 B2 * | 6/2013 | Kimura et al. | 252/301.4 R |
| 2003/0183807 A1 * | 10/2003 | Shankar et al. | 252/301.4 R |
| 2007/0205397 A1 * | 9/2007 | Goedel | 252/301.36 |
| 2007/0296326 A1 * | 12/2007 | Xiao et al. | 313/483 |
| 2010/0187976 A1 * | 7/2010 | Winkler | 313/504 |

FOREIGN PATENT DOCUMENTS

| | | |
|---|---|---|
| JP | 2543825 B2 | 7/1996 |
| JP | 9-13028 A | 1/1997 |
| JP | 9-59617 A | 3/1997 |
| JP | 9-95671 A | 4/1997 |
| JP | 10-231480 A | 9/1998 |
| JP | 11-102644 A | 4/1999 |
| JP | 2003-147352 A | 5/2003 |
| JP | 2003-238949 A | 8/2003 |
| JP | 2004-262978 A | 9/2004 |
| WO | 2010/007970 A1 | 1/2010 |
| WO | WO 2010007970 A1 * | 1/2010 |

OTHER PUBLICATIONS

International Search Report for International Application No. PCT/JP2010/053037, Date Mailed May 18, 2010.

* cited by examiner

Primary Examiner — Carol M Koslow
Assistant Examiner — Lynne Edmondson
(74) Attorney, Agent, or Firm — Roberts Mlotkowski Safran & Cole, P.C.; David S. Safran

(57) ABSTRACT

A method for manufacturing $MAl_2O_4$:Eu,RE type long-lasting phosphor ceramics that is capable of producing the ceramics at a reduced raw material cost. In addition, a sintered product of a long-lasting phosphor having no yellow body color. More specifically, the method for manufacturing $MAl_2O_4$:Eu,RE type long-lasting phosphor ceramics in which M is an alkaline earth element and RE is a rare earth element other than europium, involving mixing a BAM (alkaline earth aluminate) phosphor, an alkaline earth compound, an aluminum compound and a rare earth compound to form a mixture, and then firing the mixture; and a white $MAl_2O_4$:Eu,RE type long-lasting phosphor resulting from the method.

4 Claims, No Drawings

LONG-LASTING PHOSPHOR CERAMICS AND MANUFACTURING METHOD THEREOF

BACKGROUND OF THE INVENTION

1. Field of the Invention

The present invention relates to an inexpensive manufacturing method of long-lasting phosphor ceramics to be used in escape route signs and the like, and a sintered long-lasting phosphor having a light body color obtainable by the above manufacturing method.

2. Description of Related Art

The demand for a long-lasting phosphor to be used in escape route signs and the like has been increasing as its applications expand, since an $MAl_2O_4$:Eu,RE type long-lasting phosphor in which M is an alkaline earth element and RE is a rare earth element other than Eu was discovered by Nemoto & Co., Ltd. in 1993 (see, for example, Patent Document 1 indicated below). However, because of expensive materials and relatively high production cost, products of the phosphor are expensive, and accordingly, wide spread use of the phosphor has not yet been realized sufficiently. In addition, the phosphor is accompanied with another problem that due to a yellowish body color, it cannot be readily applied to signs required to have a white background.

Patent Document 1: Japanese Patent No. 2543825

SUMMARY OF THE INVENTION

Problem to be Solved by the Invention

For the production of $MAl_2O_4$:Eu,RE type long-lasting phosphors, europium, which is an expensive rare earth element, is used as a raw material. In addition, expensive and high-purity fine-particle type aluminum oxide, alkaline earth carbonate, rare earth oxide and the like are necessary for obtaining phosphors having a uniform composition. Thus, the cost of raw material is high, and it is difficult to produce inexpensive phosphor products. In addition, since the conventional products have a yellowish body color, application of the products is limited in terms of design.

With the foregoing in view, an object of the present invention is to provide a method for manufacturing white $MAl_2O_4$:Eu,RE type long-lasting phosphor ceramics capable of manufacturing the ceramics at a reduced raw material cost.

Means for Solving the Problems

With a view to overcoming the problems described above, the inventors have taken an advantage of the fact that recycling wastes (as used herein, "recycling waste" is a waste generated during recycling) of BAM phosphors which have been used as blue-emitting (or green-emitting) phosphors of fluorescent lamps, plasma television displays, liquid-crystal backlights or the like, contain an alkaline earth aluminate base material with high alumina content and contain an abundant amount of europium. The inventors have also found that a long-lasting phosphor can be manufactured by mixing the recycling waste of BAM phosphor with an alkaline earth compound, an aluminum compound and a rare earth compound to form a mixture, and then firing the mixture, and in addition, the long-lasting phosphor having a white body color can be obtained thereby. Consequently, the inventors have reached the present invention. The mechanism of the resulting long-lasting phosphor providing a white body color has not yet been elucidated. Although such a mechanism does not limit the technical scope of the present invention, it is assumed to involve that use of a Eu raw material which has already been dispersed uniformly in BAM can prevent Eu in the long-lasting phosphor from being unevenly distributed therein. Compounds having only divalent Eu such as $EuCO_3$ are likely to provide a yellowish body color so that uneven distribution of the Eu component may cause such a yellowish body color.

The present invention relates to a low-cost manufacturing method of long-lasting phosphor ceramics, comprising the steps of mixing a BAM phosphor with an alkaline earth compound, an aluminum compound and a rare earth compound to form a mixture, and firing the resulting mixture; and white long-lasting phosphor ceramics obtainable by this method.

Effect of the Invention

According to the present invention, long-lasting phosphor ceramics can be manufactured at a very low cost without using expensive europium as a raw material, by mixing a BAM phosphor contained in phosphor wastes with an alkaline earth compound, an aluminum compound and a rare earth compound, and by firing the resulting mixture. In addition, the obtained long-lasting phosphor ceramics has a white body color. By synergistic effects of these advantages, it is expected to increase the application fields of long-lasting phosphor ceramics so that this method is of great value.

DETAILED DESCRIPTION OF THE INVENTION

Hereinafter, the present invention will be described more specifically.

<Composition of Raw Materials>

An alkaline earth aluminate (BAM) phosphor used as a raw material in the present invention is represented by:

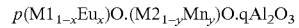

$$p(M1_{1-x}Eu_x)O\cdot(M2_{1-y}Mn_y)O\cdot qAl_2O_3$$

wherein M1 is at least one element selected from the group consisting of Ba, Sr, and Ca, and preferably Ba; M2 is Mg; and p, q, x and y are numbers which satisfy the following: $0.8 \leq p \leq 1.2$, $4.5 \leq q \leq 8.5$, $0.05 \leq x \leq 0.3$, and $0 \leq y \leq 0.4$, respectively.

Each element of the alkaline earth aluminate phosphor can be determined by X-ray fluorescence (XRF) analysis.

The term "alkaline earth compound" as used herein indicates a compound having one or more elements selected from the group consisting of Mg, Ca, Sr and Ba and being converted into an oxide in a firing step described later, or indicates a compound having an oxide itself of one or more elements selected therefrom.

The term "rare earth compound" as used herein indicates a compound having one or more elements selected from the group consisting of La, Ce, Pr, Nd, Sm, Gd, Tb, Dy, Ho, Er, Tm, Yb, Lu, Y and Sc and being converted into an oxide in a firing step described later, or indicates a compound having an oxide itself of one or more elements selected therefrom.

The term "aluminum compound" as used herein indicates a compound which will be converted into an oxide thereof in the firing step described later, or indicates an oxide compound itself.

The BAM phosphor used herein preferably includes: the recycling wastes of BAM phosphors which were used as blue-emitting or green-emitting phosphors in fluorescent lamps, plasma television displays, liquid-crystal display backlights and the like; the wastes generated during applying and/or washing processes of BAM phosphors; or BAM phosphors which fail to meet characteristics and/or specifications generally required in the art.

The BAM phosphor to be used in the present invention can be obtained from, in most cases, a waste mixture with the other phosphor or phosphors such as $Y_2O_3$:Eu (red) and $LaPO_4$:CeTb (green). The phosphor or phosphors other than BAM are dissolved by a treatment such as acid decomposition and each element therein is recycled in a process already established. Although JP 2004-262978 A proposes a method for recovering BAM phosphors having a markedly low solubility, the phosphors undergo significant deterioration in brightness during their recovering steps. Accordingly, this method has not yet been put into practical use and the BAM phosphors are not reused but discarded as a residue, currently.

The BAM phosphor residue separated and recovered from the recycling waste of phosphors can be regarded as a cost-free raw material.

The manufacturing method of the present invention comprises a mixing step of raw materials and a firing step of the resulting mixture.

First, in the mixing step, powder mixing of a BAM phosphor, an alkaline earth compound, an aluminum compound and a rare earth compound in a ball mill or the like can be selected.

Raw material powders used for the powder mixing have preferably an average particle size of from 0.3 to 50 µm as measured using an FRA measuring instrument (Micro-trak Systems) with a laser diffraction/scattering method as a measuring principle. When the average particle size is less than 0.3 µm, powders may not be dispersed uniformly in the mixing step because of firm agglomeration of the powders. An obtained phosphor may be a phosphor with a poor long-lasting brightness. When the average particle size exceeds 50 µm, the reaction between raw material powders may not proceed sufficiently and a obtained phosphor may be a phosphor with a poor long-lasting brightness.

As the alkaline earth compound or rare earth compound, any compounds can be used insofar as they may become an oxide through a below-mentioned firing step. Examples include carbonates, oxides, hydroxides, and acetates.

As the aluminum compound, any compounds can be used insofar as they may become an oxide through the below-mentioned firing step. Examples include oxides, hydroxides, and acetates.

The alkaline earth compound and the aluminum compound are added preferably in an amount to give a final composition of $MAl_2O_4$, which is an amount to give a mole ratio of the sum of alkaline earth metal elements to aluminum of 1:2. Lasting brightness can, however, be observed even if there is some degree of difference in the composition.

The alkaline earth compound, the aluminum compound, and the rare earth compound are added, for example, in an amount of from 3 to 35 mol, from 0 to 65 mol, and from 0 to 1 mol (in terms of an amount of each element by mole), respectively, per mol of the BAM phosphor (represented by the above composition formula) to give a composition of $MAl_2O_4$:Eu,RE,(Mn).

Addition of a small amount (for example, 10 mol % or less of the total amount of the alkaline earth elements) of a compound, which will become boron oxide through the below-mentioned firing step, such as boric acid or boron oxide, as a flux during mixing of the raw materials, facilitates the progress of the reaction and improves long-lasting brightness.

The firing step is performed under a reducing atmosphere (for example, under mixed gas atmosphere of nitrogen and hydrogen) or inert gas atmosphere (for example, nitrogen or argon atmosphere) (at from 1000 to 1500° C.). This is because firing under an oxidizing atmosphere such as air may oxidize a part of divalent Eu, which is an emission center, into trivalent Eu and deteriorate the long-lasting brightness.

The manufacturing method of the long-lasting phosphor ceramics of the present invention can produce particles having an average particle size of from 1 µm to 1000 µm by grinding after the firing step, or a sintered long-lasting phosphor by molding a mixture of the raw materials into a desired form and then firing.

The obtained long-lasting phosphor of the present invention has a white appearance, though a long-lasting phosphor manufactured through a conventional method without a BAM raw material has a yellowish body color. This difference is particularly marked in a light storage phosphor having a composition range represented by the following formula (1):

$$M_{(1-r-t)}Al_2O_4:Eu_r,RE_s,Mn_t \quad (1)$$

wherein M is at least one element selected from the group consisting of Ba, Sr, Mg and Ca; RE is at least one rare earth element other than Eu; r is a number from 0.005 to 0.05; s is a number from 0.005 to 0.05; and t is a number from 0 to 0.08; or in a light storage phosphor having a composition range represented by the following formula (2):

$$M_{(1-r-t)}Al_2O_4:Eu_r,Dy_s,Mn_t \quad (2)$$

wherein M is at least one element selected from the group consisting of Ba, Sr, Mg and Ca; r is a number from 0.005 to 0.05; s is a number from 0.005 to 0.05; and t is a number from 0 to 0.08.

It is particularly marked in a light storage phosphor having a composition range represented by $M_{(1-r)}Al_2O_4$: $Eu_r,Dy_s$, wherein $0.005 \leq r \leq 0.05$ and $0.005 \leq s \leq 0.05$.

The long-lasting brightness characteristic of the light storage phosphor according to the present invention was evaluated in the following manner: expose its sample to a D65 standard light of 2400 Lx for 10 minutes; measure long-lasting brightness of the sample by using a luminance meter (LS-110, Konica Minolta Sensing, Inc.) 60 minutes after blocking of an excited light; and evaluate the long-lasting brightness with a value relative to the brightness of a commercially available ZnS:Cu long-lasting phosphor powder (Product No. GSS, Nemoto & Co., Ltd.) set at 1.0.

The whiteness used herein is defined by the CIE1976 L*a*b* color system established by CIE (International Commission on Illumination) in 1976. The above-described composition has a whiteness of $L^* \geq 80$, $-10 \leq a^* \leq 10$, and $-10 \leq b^* \leq 10$.

To measure the whiteness by using the L*a*b* color system, a colorimeter (CR200, Minolta) was used.

Both the long-lasting brightness and whiteness were measured after press-molding 5 g of a powder sample under a pressure of 100 kg/cm² by using a mold having a diameter of 30 mm. A sintered product obtained by press-molding of a raw material mixed powder and then firing was subjected to the measurement as it was.

EXAMPLES

Examples of the present invention will hereinafter be described. It should not be construed that the present invention is limited to or by them.

Example 1

To 14.2 g (0.02 mol) of a blue-emitting BAM phosphor ($Ba_{0.9}MgAl_{10}O_{17}$:$Eu_{0.1}$) (determined by XRF X-ray fluorescence analysis) having an average particle size of 7.5 µm and recovered from waste lamps, added were 23.9 g (0.16 mol) of strontium carbonate having an average particle size of 2.2 µm, 10.3 g (0.1 mol) of aluminum oxide having an average particle size of 3.5 µm, 0.94 g (0.0025 mol) of dysprosium oxide having an average particle size of 7.3 µm, and 1 g of boric acid which have passed through 200 mesh, followed by mixing in a ball mill. The resulting mixture was fired at 1300° C. for one hour (under 97:3 nitrogen-hydrogen atmosphere) in an alumina crucible to obtain a long-lasting phosphor.

The obtained phosphor had a composition of $Sr_{0.800}Ba_{0.090}Mg_{0.100}Al_2O_4$: $Eu_{0.010}$,$Dy_{0.025}$ and had a good long-lasting brightness as high as 18.5. In addition, it had a whiteness of L*=92.0, a*=−4.3 and b*=6.5, and thus had a white appearance.

Examples 2 to 4

In the same manner as in Example 1 except for the compositions, long-lasting phosphors were obtained.

Details of the mixed raw materials in respective examples are shown in Table 2, while the compositions and results of color evaluation are shown in Table 2.

Example 5

In the same manner as in Example 1, a raw material mixed powder was prepared. Prior to firing, 5 g of the resulting mixed powder was press-molded under a pressure of 100 kg/cm² by using a mold having a diameter of 30 mm, and fired under the same conditions as those in Example 1 to obtain a sintered product of a long-lasting phosphor. The obtained sintered product had a good long-lasting brightness as high as 33.8. It had a whiteness of L*=93.5, a*=−4.1 and b*=5.6, and thus had a white appearance.

Example 6

To 14.5 g (0.02 mol) of a green-emitting BAM phosphor ($Ba_{0.85}Mg_{0.7}Al_{10}O_{17}$: $Eu_{0.15}$,$Mn_{0.3}$) (determined by XRF X-ray fluorescence analysis) having an average particle size of 8.1 μm and recovered from waste lamps, added were 24.0 g (0.16 mol) of strontium carbonate, 10.4 g (0.1 mol) of aluminum oxide, 0.95 g (0.13 mol) of dysprosium oxide, and 1 g of boric acid, followed by mixing in a ball mill. Prior to firing, 5 g of the resulting mixture was press-molded under a pressure of 100 kg/cm² by using a mold having a diameter of 30 mm. The press-molded mixture was then fired at 1300° C. for one hour (under 97:3 nitrogen-hydrogen atmosphere) in an alumina crucible to obtain a sintered product of a long-lasting phosphor. The obtained long-lasting phosphor had a composition of $Sr_{0.800}Ba_{0.085}Mg_{0.070}Al_2O_4$:$Eu_{0.015}$, $Mn_{0.030}$,Dy0.025 and had a good long-lasting brightness as high as 31.0. In addition, it had a whiteness of L*=93.1, a*=−4.5 and b*=6.4, and thus had a white appearance.

Example 7

To 14.2 g (0.02 mol) of a blue-emitting BAM phosphor ($Ba_{0.9}MgAl_{10}O_{17}$:$Eu_{0.1}$) recovered from waste lamps, added were 16.2 g (0.162 mol) of calcium carbonate having an average particle size of 2.8 μm, 10.3 g (0.1 mol) of aluminum oxide, 0.33 g (0.001 mol) of lanthanum oxide having an average particle size of 6.6 μm, 0.34 g (0.001 mol) of neodymium oxide having an average particle size of 7.4 μm, and 1 g of boric acid, followed by mixing in a ball mill. The resulting mixture was then fired at 1300° C. for one hour (under 97:3 nitrogen-hydrogen atmosphere) in an alumina crucible to obtain a long-lasting phosphor.

The obtained phosphor had a composition of $Ca_{0.800}Ba_{0.090}Mg_{0.100}Al_2O_4$:$Eu_{0.010}$, $La_{0.010}$,$N_{0.010}$ and had a good long-lasting brightness as high as 5.6. In addition, it had a whiteness of L*=94.1, a*=−3.0 and b*=2.4, and thus had a white appearance.

Example 8

To 14.2 g (0.02 mol) of a commercially-available blue-emitting BAM phosphor (Nichia Corporation, average particle size: 8.3 μm, $Ba_{0.9}MgAl_{10}O_{17}$:$Eu_{0.1}$ determined by XRF X-ray fluorescence analysis), added were 23.9 g (0.16 mol) of strontium carbonate having an average particle size of 2.2 μm, 10.3 g (0.1 mol) of aluminum oxide having an average particle size of 3.5 μm, 0.94 g (0.0025 mol) of dysprosium oxide having an average particle size of 7.3 μm, and 1 g of boric acid which has passed through 200 mesh, followed by mixing in a ball mill. The resulting mixture was then fired at 1300° C. for one hour (under 97:3 nitrogen-hydrogen atmosphere) in an alumina crucible to obtain a long-lasting phosphor.

The obtained phosphor had a composition of $Sr_{0.800}Ba_{0.090}Mg_{0.100}Al_2O_4$:$Eu_{0.010}$, $Dy_{0.025}$ and had a good long-lasting brightness as high as 19.8. In addition, it had a whiteness of L*=93.2, a*=−4.1 and b*=6.1, and thus had a white appearance.

Comparative Example 1

The 3.6 g of barium carbonate having an average particle size of 2.4 μm, 1.7 g of magnesium carbonate having an average particle size of 3.2 μm, 23.9 g of strontium carbonate, 20.6 g of aluminum oxide, 0.36 g of europium oxide having an average particle size of 6.7 μm, 0.94 g of dysprosium oxide, and 1 g of boric acid were separately added, followed by mixing in a ball mill. The resulting mixture was then fired at 1300° C. for one hour (under 97:3 nitrogen-hydrogen atmosphere) in an alumina crucible to obtain a long-lasting phosphor. The obtained phosphor had a composition of $Sr_{0.800}Ba_{0.090}Mg_{0.100}Al_2O_4$:$Eu_{0.010}Dy_{0.025}$ and had a good long-lasting brightness as high as 20.1. It had however a whiteness of L*=88.1, a*=−10.2 and b*=19.6, and thus had a yellowish body color.

Comparative Example 2

In the same manner as in Comparative Example 1 except for the composition, a long-lasting phosphor was obtained.

The details of the mixed raw materials are shown in Table 1, while the composition and the color evaluation results are shown in Table 2.

Comparative Example 3

A sintered product of a long-lasting phosphor was obtained by preparing a raw material mixed powder in the same manner as in Comparative Example 1, press-molding of 5 g of the resulting mixed powder under a pressure of 100 kg/cm² in a mold having a diameter of 30 mm, and then firing under the same conditions as those in Comparative Example 1. The obtained phosphor had a good long-lasting brightness as high as 33.3. It had however a whiteness of L*=90.3, a*=−8.7 and b*=16.9, and thus had a yellowish body color.

Comparative Example 4

The 29.5 g of strontium carbonate, 20.6 g of aluminum oxide, 0.36 g of europium oxide, 0.94 g of dysprosium oxide, and 1 g of boric acid were separately added, followed by mixing in a ball mill. The resulting mixture was then fired at 1300° C. for one hour (under 97:3 nitrogen-hydrogen atmosphere) in an alumina crucible to obtain a long-lasting phosphor. The obtained phosphor had a composition of $Sr_{0.990}Al_2O_4$:$Eu_{0.010}$,$Dy_{0.025}$ and had a good long-lasting brightness as high as 20.3. It had however a whiteness of L*=87.9, a*=−9.3 and b*=19.2, and thus had a yellowish body color.

TABLE 1

| | BAM phosphor | | | Alkaline earth compound | | | Aluminum compound | | Rare earth compound | | | Boric acid (g) |
|---|---|---|---|---|---|---|---|---|---|---|---|---|
| | Blue-emitting BAM (g) | Green-emitting BAM (g) | BAM (mol) | kind | amount (g) | mole ratio relative to BAM | $Al_2O_3$ (g) | mole ratio relative to BAM | kind | amount (g) | mole ratio relative to BAM | |
| Example 1 | 14.2 | — | 0.020 | $SrCO_3$ | 23.9 | 8.1 | 10.3 | 5 | $Dy_2O_3$ | 0.94 | 0.13 | 1 |
| Example 2 | 26.1 | — | 0.037 | $SrCO_3$ | 19.1 | 3.5 | 1.9 | 0.5 | $Dy_2O_3$ | 1.73 | 0.13 | 1 |
| Example 3 | 4.3 | — | 0.006 | $SrCO_3$ | 27.8 | 31.4 | 17.4 | 28.4 | $Dy_2O_3$ | 0.28 | 0.13 | 1 |
| Example 4 | 10.1 | — | 0.014 | $SrCO_3$ | 25.5 | 12.3 | 13.2 | 9.2 | $Dy_2O_3$ | 0.67 | 0.13 | 1 |
| Example 5 | 14.2 | — | 0.020 | $SrCO_3$ | 23.9 | 8.1 | 10.3 | 5 | $Dy_2O_3$ | 0.94 | 0.13 | 1 |
| Example 6 | — | 14.5 | 0.020 | $SrCO_3$ | 24 | 8.13 | 10.4 | 5.1 | $Dy_2O_3$ | 0.95 | 0.13 | 1 |
| Example 7 | 14.2 | — | 0.020 | $CaCO_3$ | 16.2 | 8.1 | 10.3 | 5 | $La_2O_3 + Nd_2O_3$ | 0.33 + 0.34 | 0.1 | 1 |
| Example 8 | 14.2 | — | 0.020 | $SrCO_3$ | 23.9 | 8.1 | 10.3 | 5 | $Dy_2O_3$ | 0.94 | 0.13 | 1 |

| | Alkaline earth compound | | | | | | Aluminum compound | | Rare earth compound | | | Boric acid (g) |
|---|---|---|---|---|---|---|---|---|---|---|---|---|
| | $BaCO_3$ (g) | $BaCO_3$ (mol) | $MgCO_3$ (g) | $MgCO_3$ (mol) | $SrCO_3$ (g) | $SrCO_3$ (mol) | $Al_2O_3$ (g) | $Al_2O_3$ (mol) | added | added (g) | total (mol) | |
| Comp. Ex. 1 | 3.6 | 0.018 | 1.7 | 0.02 | 23.9 | 0.16 | 20.6 | 0.2 | $Eu_2O_3 + Dy_2O_3$ | 0.36 + 0.94 | 0.00364 | 1 |
| Comp. Ex. 2 | 1.1 | 0.006 | 0.5 | 0.006 | 27.8 | 0.19 | 20.5 | 0.2 | $Eu_2O_3 + Dy_2O_3$ | 0.11 + 0.28 | 0.00109 | 1 |
| Comp. Ex. 3 | 3.6 | 0.018 | 1.7 | 0.002 | 23.9 | 0.16 | 20.6 | 0.2 | $Eu_2O_3 + Dy_2O_3$ | 0.36 + 0.94 | 0.00364 | 1 |
| Comp. Ex. 4 | — | — | — | — | 29.5 | 0.2 | 20.6 | 0.2 | $Eu_2O_3 + Dy_2O_3$ | 0.36 + 0.94 | 0.00364 | 1 |

TABLE 2

| | Composition | Long-lasting brightness | L* | a* | b* | Appearance |
|---|---|---|---|---|---|---|
| Ex. 1 | $(Sr_{0.800}Ba_{0.090}Mg_{0.100})Al_2O_4$: $Eu_{0.010}$, $Dy_{0.025}$ | 18.5 | 92 | −4.3 | 6.5 | white |
| Ex. 2 | $(Sr_{0.636}Ba_{0.164}Mg_{0.182})Al_2O_4$: $Eu_{0.018}$, $Dy_{0.045}$ | 16.5 | 90 | −4.8 | 7.8 | white |
| Ex. 3 | $(Sr_{0.939}Ba_{0.028}Mg_{0.030})Al_2O_4$: $Eu_{0.003}$, $Dy_{0.008}$ | 4.4 | 95.7 | −3.3 | 3.8 | white |
| Ex. 4 | $(Sr_{0.857}Ba_{0.065}Mg_{0.071})Al_2O_4$: $Eu_{0.007}$, $Dy_{0.018}$ | 13.9 | 93.6 | −4.3 | 5.3 | white |
| Ex. 5 | $(Sr_{0.800}Ba_{0.090}Mg_{0.100})Al_2O_4$: $Eu_{0.010}$, $Dy_{0.025}$ | 33.8 | 93.5 | −4.1 | 5.6 | white |
| Ex. 6 | $(Sr_{0.800}Ba_{0.085}Mg_{0.070})Al_2O_4$: $Eu_{0.015}$, $Mn_{0.030}$, $Dy_{0.025}$ | 31 | 93.1 | −4.5 | 6.4 | white |
| Ex. 7 | $Ca_{0.800}Ba_{0.090}Mg_{0.100}Al_2O_4$: $Eu_{0.010}$, $La_{0.010}$, $Nd_{0.010}$ | 5.6 | 94.1 | −3 | 2.4 | white |
| Ex. 8 | $(Sr_{0.800}Ba_{0.090}Mg_{0.100})Al_2O_4$: $Eu_{0.010}$, $Dy_{0.025}$ | 19.8 | 93.2 | −4.1 | 6.1 | white |
| Comp. Ex. 1 | $(Sr_{0.800}Ba_{0.090}Mg_{0.100})Al_2O_4$: $Eu_{0.010}$, $Dy_{0.025}$ | 20.1 | 88.1 | −10.2 | 19.6 | yellow |
| Comp. Ex. 2 | $(Sr_{0.939}Ba_{0.027}Mg_{0.030})Al_2O_4$: $Eu_{0.003}$, $Dy_{0.008}$ | 5.2 | 91.1 | −5.9 | 9.7 | pale yellow |
| Comp. Ex. 3 | $(Sr_{0.800}Ba_{0.090}Mg_{0.100})Al_2O_4$: $Eu_{0.010}$, $Dy_{0.025}$ | 33.3 | 90.3 | −8.7 | 16.9 | yellow |
| Comp. Ex. 4 | $Sr_{0.990}Al_2O_4$: $Eu_{0.010}$, $Dy_{0.025}$ | 20.3 | 87.9 | −9.3 | 19.2 | yellow |

It is evident from the results shown in Tables 1 and 2 that although the long-lasting phosphors obtained in both Example 1 and Comparative Example 1 have the same composition and have an aluminum compound added, the long-lasting phosphor of Example 1 using a BAM phosphor as a raw material has a higher whiteness and a white appearance.

It is also evident that although the sintered products obtained in Example 5 and Comparative Example 3 has the same composition, there is a difference in whiteness between them.

It is evident that a difference in whiteness between the long-lasting phosphors obtained in Example 5 and Comparative Example 3 both containing Eu at a ratio of 0.05 or greater is more remarkable than a difference in whiteness between the long-lasting phosphors obtained in Example 3 and Comparative Example 2 both containing Eu at a ratio less than 0.05.

It is evident from the results of Example 7 that a long-lasting phosphor having a white appearance and a higher whiteness can be obtained even when two rare earth compounds are used.

It is evident from the results of Example 8 that a long-lasting phosphor having a higher whiteness can be obtained even when a commercially available BAM phosphor is used.

The invention claimed is:

1. A method for manufacturing a type of long-lasting phosphor ceramics, comprising the steps of:
   mixing an alkaline earth aluminate phosphor, an alkaline earth compound, an aluminum compound, and a rare earth compound to form a mixture; and
   firing the mixture, and
   wherein the long-lasting phosphor ceramics are represented by the compositional formula (1):

$$M_{(1-r-t)}Al_2O_4:Eu_r,RE_s,Mn_t \quad (1)$$

wherein M is at least one element selected from the group consisting of Ba, Sr, Mg and Ca; RE is at least one rare earth element other than Eu; r is a number from 0.005 to 0.05; s is a number from 0.005 to 0.05; and t is a number from 0 to 0.08.

2. The method for manufacturing long-lasting phosphor ceramics according to claim 1, wherein the alkaline earth aluminate phosphor is obtained by being separated and recovered from: recycling wastes of phosphors; wastes which is generated during at least one of an applying process and a washing process of phosphors; or phosphors which fail to meet at least one of characteristics and specifications.

3. The method for manufacturing long-lasting phosphor ceramics according to claim 1, further comprising the step of molding the mixture, after the step of mixing step but prior to the step of firing.

4. The method for manufacturing long-lasting phosphor ceramics according to claim 2, further comprising the step of molding the mixture, after the step of mixing step but prior to the step of firing.

* * * * *